(12) United States Patent
Brown et al.

(10) Patent No.: US 10,051,325 B2
(45) Date of Patent: Aug. 14, 2018

(54) ON-SCREEN TELEVISION INPUT MANAGEMENT

(71) Applicant: Contemporary Display LLC, Plano, TX (US)

(72) Inventors: Alan G. Brown, Manhattan Beach, CA (US); Stephen Brown, Thousand Oaks, CA (US); Leo Chen, Ontario, CA (US); Christopher M. Kurpinski, Berkely, MI (US); Damien Stolarz, Los Angeles, CA (US)

(73) Assignee: Contemporary Display LLC, Plano, TX (US)

( * ) Notice: Subject to any disclaimer, the term of this patent is extended or adjusted under 35 U.S.C. 154(b) by 0 days.

(21) Appl. No.: 15/236,749

(22) Filed: Aug. 15, 2016

(65) Prior Publication Data

US 2017/0127131 A1  May 4, 2017

Related U.S. Application Data

(63) Continuation of application No. 14/512,510, filed on Oct. 13, 2014, now Pat. No. 9,438,954, which is a
(Continued)

(51) Int. Cl.
*H04N 21/41* (2011.01)
*H04N 21/462* (2011.01)
(Continued)

(52) U.S. Cl.
CPC ..... *H04N 21/4622* (2013.01); *H04N 21/4113* (2013.01); *H04N 21/4135* (2013.01);
(Continued)

(58) Field of Classification Search
CPC .......... H04N 21/4135; H04N 21/4622; H04N 21/4113; H04N 21/4143; H04N 21/42204;
(Continued)

(56) References Cited

U.S. PATENT DOCUMENTS 6,018,768 A     1/2000 Ullman et al.
6,219,839 B1 *  4/2001 Sampsell ............ H04L 12/2805
                                           348/E5.103
(Continued)

FOREIGN PATENT DOCUMENTS

KR     10-2007-0037890      4/2007

OTHER PUBLICATIONS

Final Office Action issued on U.S. Appl. No. 12/347,801, dated Apr. 1, 2013.
(Continued)

*Primary Examiner* — Hunter B Lonsberry
(74) *Attorney, Agent, or Firm* — Tolar Law Group, PC

(57) ABSTRACT

A television system that provides an on screen display menu system that allows a user to select from available input source using a graphical user interface. The television system also automatically adapts to the type on input signal selected for display. The television system and on screen display menu also support interaction between the television system and attached devices to unify the control of such devices including attached personal computers through the remote control of the television system.

20 Claims, 14 Drawing Sheets

Related U.S. Application Data continuation of application No. 12/347,801, filed on Dec. 31, 2008, now Pat. No. 8,863,219.

(60) Provisional application No. 61/018,261, filed on Dec. 31, 2007.

(51) Int. Cl.

| | | |
|---|---|---|
| *H04N 21/422* | (2011.01) | |
| *H04N 21/431* | (2011.01) | |
| *H04N 21/4363* | (2011.01) | |
| *H04N 21/443* | (2011.01) | |
| *H04N 21/472* | (2011.01) | |
| *H04N 21/478* | (2011.01) | |
| *H04N 21/4782* | (2011.01) | |
| *H04N 21/4143* | (2011.01) | |

(52) U.S. Cl.
CPC ... *H04N 21/4143* (2013.01); *H04N 21/42204* (2013.01); *H04N 21/4312* (2013.01); *H04N 21/4363* (2013.01); *H04N 21/443* (2013.01); *H04N 21/4781* (2013.01); *H04N 21/4782* (2013.01); *H04N 21/47202* (2013.01)

(58) Field of Classification Search
CPC ........... H04N 21/4312; H04N 21/4363; H04N 21/443; H04N 21/47202; H04N 21/4781; H04N 21/4782
See application file for complete search history.

(56) References Cited

U.S. PATENT DOCUMENTS

| | | |
|---|---|---|
| 6,588,012 B2 | 7/2003 | Tanaka et al. |
| 7,880,816 B2 | 2/2011 | Kinoshita et al. |
| 7,991,268 B2 | 8/2011 | Sandblom |
| 8,411,209 B2 | 4/2013 | Kim et al. |
| 2003/0079234 A1 | 4/2003 | Rasmussen |
| 2006/0170661 A1* | 8/2006 | Clynes .................. G06F 8/65 345/204 |
| 2010/0058421 A1 | 3/2010 | Hastings et al. |
| 2014/0033252 A1 | 1/2014 | Radloff et al. |

OTHER PUBLICATIONS

Final Office Action on U.S. Appl. No. 14/512,510 dated Jan. 14, 2016.
Non-Final Office Action for U.S. Appl. No. 12/347,801, dated Jun. 25, 2012.
Non-Final Office Action issued on U.S. Appl. No. 12/347,801, dated Feb. 27, 2014.
Non-Final Office Action on U.S. Appl. No. 14/512,510, dated May 5, 2015.
Notice of Allowance on U.S. Appl. No. 12/347,801, dated Aug. 12, 2014.
Notice of Allowance on U.S. Appl. No. 14/512,510 dated May 3, 2016.
Machine translation of Korean Application KR10-2007-0037890.

\* cited by examiner

ON-SCREEN TELEVISION INPUT MANAGEMENT

CROSS-REFERENCE TO RELATED PATENT APPLICATIONS

This application is a continuation of U.S. application Ser. No. 14/512,510, filed Oct. 13, 2014, which is a continuation of U.S. application Ser. No. 12/347,801, filed on Dec. 31, 2008, which claims priority to U.S. Provisional Patent Application No. 61/018,261, all of which are hereby incorporated by reference in their entireties.

BACKGROUND OF THE INVENTION

1. Field of the Invention

Embodiments of the present invention relate to a user interface for and management of input signals provided by a television system. Specifically, the embodiments of the present invention include an on screen display (OSD) system for managing and navigating television system functionality and input source selection.

2. Description of the Related Art

Television systems provide a set of connectors to receive multiple input sources. An input source can be a video cassette recorder (VCR) device, a digital versatile disk (DVD) device, a cable or satellite receiver or an audio amplifier. Connector types for receiving these input sources include composite connectors, S-Video connectors, component connectors, coaxial connectors, HDMI connectors and audio RCA connectors. Any of these connectors can be directly connected to an input source or connected indirectly to the television system through a switch. A switch allows multiple input sources to share a single connector on a television by multiplexing the input sources to a single connector.

A user of a television system can select an input source for display using a button on a remote control for the television system. A separate input button may be provided for each input source or a single button may be provided to cycle through the signals received from each connector. If a switch is utilized, then the input source attached to the switch must be manually selected at the switch in addition to the input selection through the television system. The television system displays a name for each of the input sources as they are selected or cycled through. The names are fixed in relation to the connector and typically identify the connector type (i.e., S-Video, component or HDMI). In some cases other labels are utilized, such as Video 1, DVD or YbYyYr, that are intended to identify a signal source or type. However, these labels are fixed to the connector and designations such as DVD may actually be for connectors attached to another device such as a cable box and not to a DVD device. As a result, input source selection is difficult to understand and utilize. Many users unintentionally change input sources and require assistance to change the input sources to the desired input source.

BRIEF SUMMARY OF THE INVENTION

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
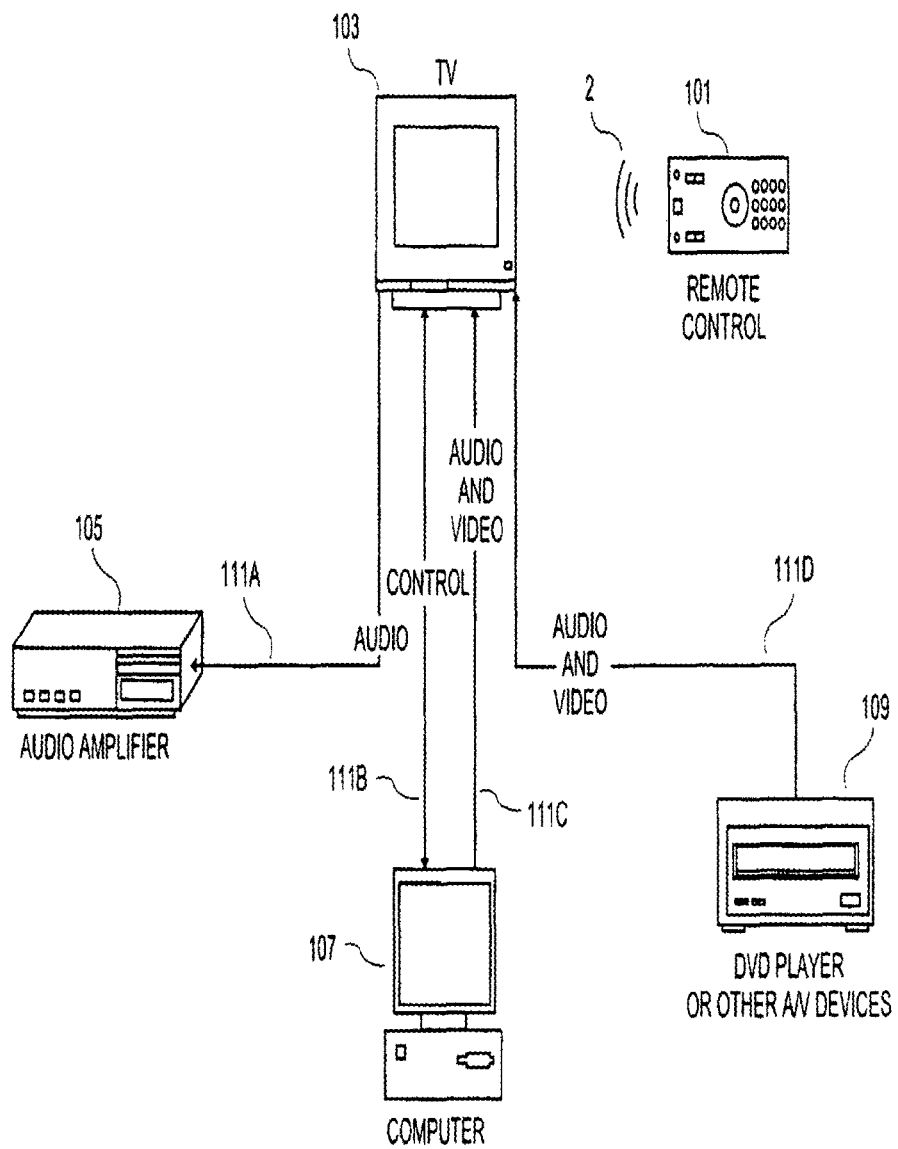
FIG. 1 is a diagram of one embodiment of a television system for managing input sources entirely within the television monitor housing.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a device memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "selecting," "displaying," "searching," "receiving," "updating," "modifying," "assigning," "requesting," "notifying," or the like, refer to the actions and processes of a television system, or similar electronic device having processing circuitry and components that manipulate and transform data represented as physical (electronic) quantities within the system's registers and memories into other data similarly represented as physical quantities within the television system memories, registers or other such information storage, transmission or display devices.

The present invention also relates to an apparatus for performing the operations herein. This apparatus may be specially constructed for the required purposes or it may comprise a general purpose device selectively activated or reconfigured by a program stored in the device. Such a program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein can be implemented as a particular electronic device, component, computer or other apparatus. However, various general purpose systems may also be used with the programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine or computer readable medium includes any mechanism for storing information in a form readable by a computer or similar machine. For example, a computer readable medium includes read only memory ("ROM"), random access memory ("RAM"), magnetic disk storage media; optical storage media, flash memory devices or other type of machine-accessible storage media.

FIG. 1 is a diagram of one embodiment of a television system 103 that manages input sources. The figure depicts an example configuration with possible input sources that are each connected to a television system 103. The example television system 103 includes the television monitor and remote control 101 and is connected to a number of other devices including an audio amplifier 105, personal computer 107 and DVD player 109. One skilled in the art would understand that any number of additional devices could also be connected to the television system 103 or television monitor.

The television monitor can be any type of display device including a liquid crystal display (LCD) device, plasma display device, light emitting diode (LED) display device, organic light emitting diode (OLED) display device, a cathode ray tube (CRT), a projection system including a light or laser projection system or similar display technology. The television monitor can include the display device, backlight and control boards for driving the display device. The television monitor can also include speakers and similar components.

The television system 103 can be designed to accommodate any number of connections 111A-D. The television system 103 can also be configured to support any type of connections including coaxial, S-Video, component, analog audio, digital audio, (e.g., optical (TOSLINK)), HDMI, DVI, RGB, composite, universal serial bus (USB), RS-232 and similar connection types and signal communication mediums. An input source can be connected to the television system 103 through any of the connection types that it supports or through multiple connections types. The television system 103 can also be configured to communicate with any input source through wireless communication protocols such as Bluetooth, 802.11b/g/n, infrared (IR), radio frequency (RF) or similar wireless technologies and mediums. Specific examples are discussed herein with particular connectors, communication protocols or communication mediums. However, one skilled in the art would understand that other connector types or combination of communications mediums and protocols could be utilized in analogous systems consistent with the principles, methods and system described herein.

The television system 103 can also include processing capabilities to manage attached devices. This functionality may be implemented in firmware, hardware, software or similarly implemented. The television system 103 can include a lookup table to store configuration information for devices that may be attached to the television system. An identifier for each device can be received at power on for the device or at the time of connection. The identifier can be used with the look up table to retrieve the configuration information. The configuration information can tell the television system 103, which remote control commands correspond with each attached device. The television system 103 can also inform the user through the on screen display if a device in not supported or obtain an update or new firmware over an attached network if possible.

The audio and video output of the television system can be driven by input sources or generated by the processor and software of the television system 103 itself. The television system 103 can also intermix the input sources with its own generated content. For example, the television system 103 can generate user interface menus (e.g., the on screen display (OSD) menu) to be displayed through the television monitor. The television system can utilize any number of input sources within the user interface (e.g., the OSD) to display the input sources to the user to assist in the decision making process of the user. For example, the television system 103 can embed each incoming video signal into a menu of the OSD to allow the user to select the input source that the user would like to see. The system 103 can also capture still images from the incoming video signal of the input sources. These still images can then be displayed for input source selection purposes.

The input sources generate video and audio signals in different manners. Some input sources such as cable or satellite receivers are providing a signal from a remote source. These receivers may decode, decrypt, tune or similarly manage the remote input source. These input sources may be separately controlled from the television system 103.

For example, the cable or satellite receiver can select a channel to output. Thus, once such an input source is selected through the television system 103, the input source is further controlled through its own remote control or user interface.

A personal computer 107 can offer an input source. The personal computer 107 provides a video or audio signal driven by its software applications and operating system. The personal computer system input 111C can be selected through the television system 103. The television system 103 may allow for some control or interaction with the computer 107 through a control channel with the computer 111B. The control or interaction may allow the computer 107 to adjust the settings of the television system 103 and/or monitor. The personal computer 107 may have a software application or similar software component that allows it to communicate with the television system 103. The software application can provide a user interface at the personal computer and is able to communicate with the television system 103 through a shared protocol. In one embodiment, the input sources can also be sent to the personal computer 107. Other devices can provide this functionality or provide analogous functionality by executing analogous software. Other devices that provide this functionality can include console devices (e.g., gaming consoles), handheld devices, music devices or similar devices.

Other types of input sources that can be connected to the television system 103 can include an audio amplifier 105 that receives an audio signal or manages the audio signal from the television system 103, a DVD player 109 or similar playback device, a gaming console, consumer electronic devices such as cameras and similar devices. Audio amplifiers 105 and similar devices such as upconverters can receive audio or video signals output by the television system 103 and output that signal to a sound system, return the modified signal to the system 103 or similarly manage the audio or video signals.

Other devices such as the playback devices and gaming consoles, primarily supply an input video and audio signal to the television system 103 that can be selected for display. Some of these devices can be combined with one another or with the system 103. For example, a personal computer 107, DVD player 109 or gaming console may be combined with the television system 103 to share the same housing. Such combination television systems 103 may have components that share a printed circuit board and communicate their signals directly across such a board without the use of external connectors. Any type of communication medium or protocol can be used across a printed circuit board or similar medium (e.g., 12C).

The functionality of a television system 103 can be controlled by a user through a remote control 101. The remote control 101 allows a user to control the functionality of the television system 103 such as adjusting channels, volume and similar settings. The remote control 101 also allows the user to control the features of the television system 103 including the use of a menu system that is displayed through the television monitor. The remote control 101 provides this combined control of the features of both devices. The remote control 101 can also be configured to control other devices in the system either directly or through the television system 103. The remote control 101 can output a signal of a type and format that is understood by other devices to directly control the devices. The remote control 101 can indirectly control other devices by issuing signals and commands that are received by the television system 103 and relayed or translated by the television system 103 to the respective devices. The television system 103 may be connected with a command channel using any communication medium with the other devices to provide these commands to the other devices.

Figure 2:
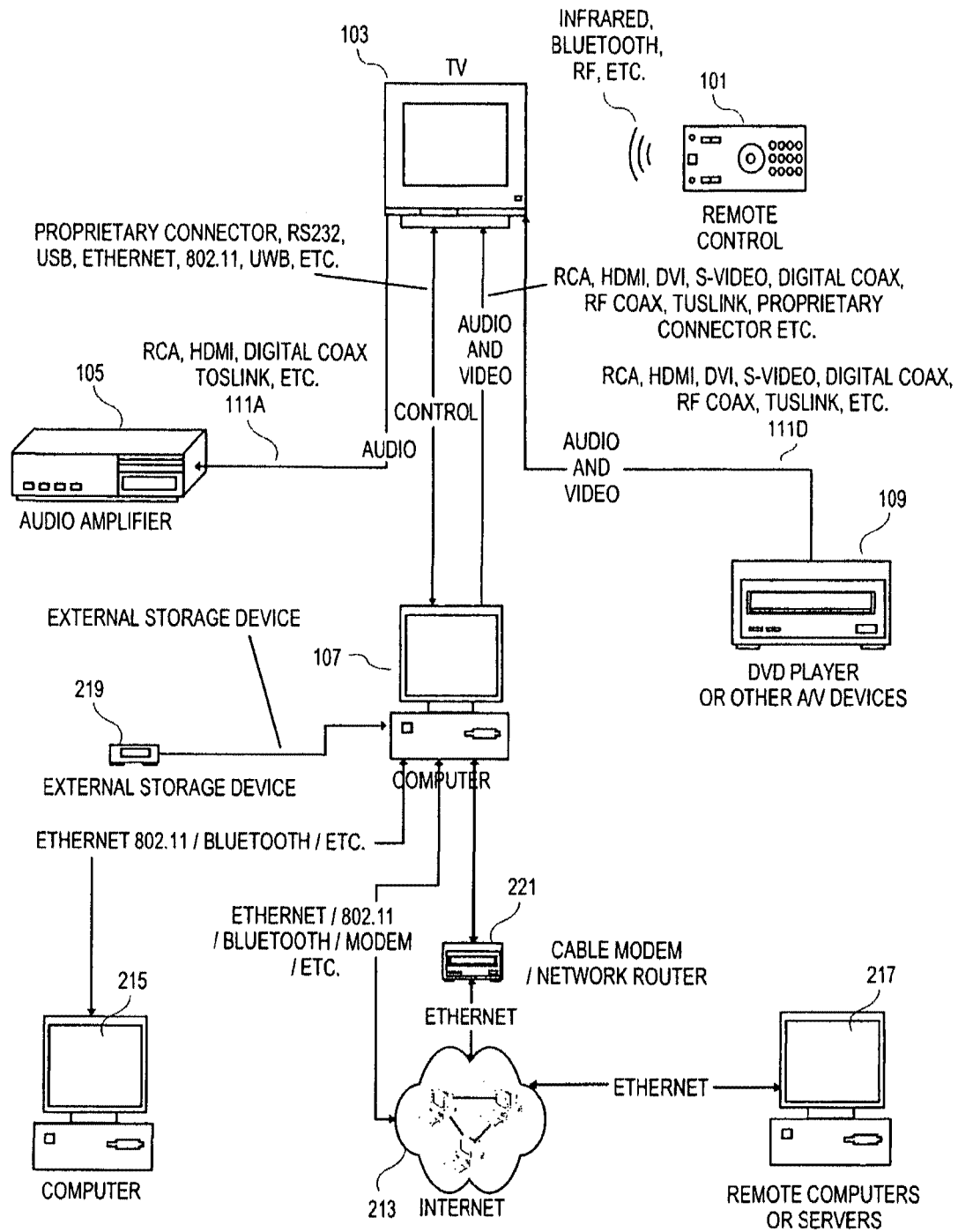
FIG. 2 is a diagram of one embodiment of the television system within a network of related devices.

FIG. 2 is a diagram of one embodiment of the management system within a network of related devices. The television system 103 can also be part of a larger system or network. The network may be primarily expanded through a connected personal computer 109 or similar devices (e.g., a console device). The expanded network of indirectly connected devices expands the resources and input sources that are available to the television system 103.

Additional resources can be connected through networks such as local area networks (LANs), wide area networks (WANs), such as the Internet 213, or through similar types of networks. Additional devices that can then communicate directly or indirectly with the television system 103 can include remote computers 215, 217 (e.g., websites), storage devices 219, network communication devices 221 and similar devices.

The television system can receive additional input sources over the expanded network and updates to the firmware or software of the television system. This may be done directly through the OSD or through the software application provided by an attached personal computer.

Figure 3:
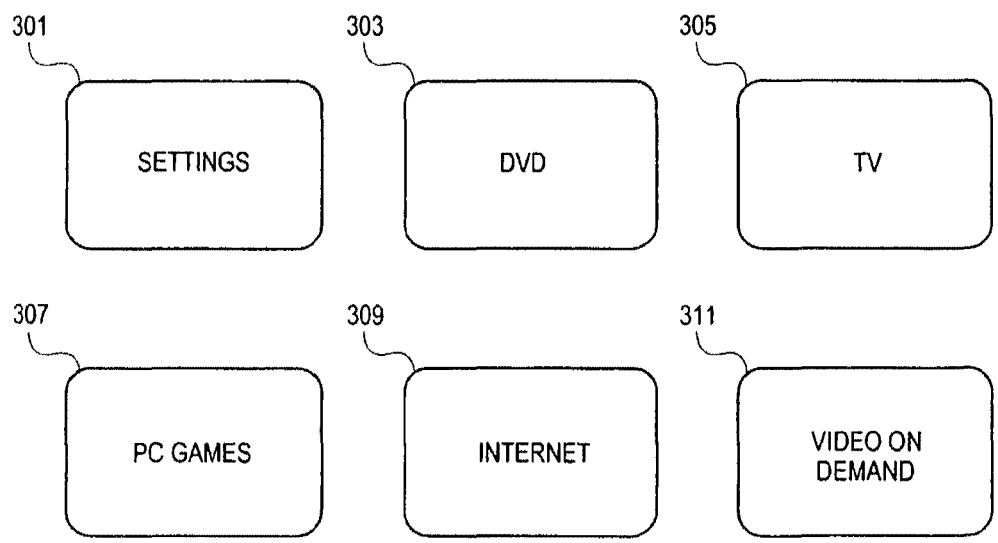
FIG. 3 is a diagram of one embodiment of an on screen display menu.

FIG. 3 is a diagram of one embodiment of an on screen display menu. The example display is a simplified illustration of the menu that the television system can generate and display to a user through the television monitor and may be referred to herein as the "on screen display system." Any lay out, number of navigation options, or control scheme can be provided that allows a user to identify an input source by a common name or description instead of through a connection type. The user interface can also provide navigation options that grant access to content that is generated or managed by the television system such as settings 301, video on demand (VOD) 311 and similar content.

Some user interface options offer access to or control over other input sources For example, selection of a "PC Games" 307 or "Internet" 309 option may both invoke applications on an attached computer. However, the options like the "PC Games" 307 option may generate a further menu of available games hosted by an attached computer. Selection of one of those games will activate the appropriate program and switch the input to the computer. Similarly, selection of the "Internet" 309 can invoke a web browser on the attached computer and switch the input source to the computer.

In one embodiment, the on screen display system displays the navigation options as simple icons that label each of the available input sources. The icons can be generated based on the availability of a signal on a particular connector, identification of the device that is connected by automatic signal sensing, communication with the attached device or through a similar system. The icons can also be graphical icons that represent the devices, input sources or content of the input sources, such as a DVD disc that represents a DVD player or an image from the movie on the DVD. The type and layout of the icons can be configured by the user or automatically selected. The icons can be stored within any component of the television system. Also, additional icons can be loaded into the system. The additional icons can be downloaded over a network such as the Internet or uploaded from an external storage device such as a consumer storage device through connections such as USB or similar connection. The icons can be configured or generated through a program running on a connected computing device.

In one embodiment, the icons can include or may be replaced by video from the respective input source or a still grab from the input source. An image or video may be displayed for each input source. A user can cycle or move between the available navigation options using the remote control. Highlighting or similarly indicating an input source can initiate the update of the video or image being displayed. The video or image can also be enlarged when selected. Confirming a selection switches the input source and causes it to be displayed full screen or to the normal operations settings such as letterboxing, stretching, and similar settings.

In one embodiment, the on screen display system displays the navigation options as text labels or as text labels combined with icons. The text labels can be configured by the user (e.g., input through a peripheral device such as a keyboard or selected through a software keyboard interface) or automatically selected (e.g., utilizing default labels or information obtained from an associated device). The text labels can be downloaded over a network such as the Internet or uploaded from an external storage device such as a consumer storage device. The text labels can also be configured by a program running on a connected computing device.

The on screen display system is designed to provide a uniform presentation and user interface for interacting with the television system. The on screen display system also can integrate the user interface for other attached devices such as an attached personal computer. The television system provides the on screen display menus for any attached device that supports the feature allowing a user to control those devices through the remote control and on screen display menus. For example, the user may manipulate settings and select programs through the on screen display menus for the programs executing on the attached personal computer.

Some physical input ports such as HDMI combine audio and video into a single cable while many other input ports such as component, S-Video, composite, analog RCA, VGA, DVI-A, DVI-D, TosLink, SPDIF, and coaxial digital provide audio and video as separate cables. Many other television systems have fixed pairings between audio and video input ports. The on screen display system allows the user of the television system to configure arbitrary pairings between audio and video inputs, allowing any video input to be paired with the appropriate audio input (so that the sound matches the video). This allows users to easily hook up their devices to any available input ports of the television system and use the on screen display system to select or match the audio input with the desired video input.

Once a navigation option or set of navigation options representing a pair of audio and video inputs has been selected by the user, the video corresponding to that input selection will be shown on the screen, and the audio corresponding to that input selection will be played through the television speakers or other audio output such as headphone jacks, or passed through the TV system to external devices such as an audio amplifier as appropriate.

Figure 4:
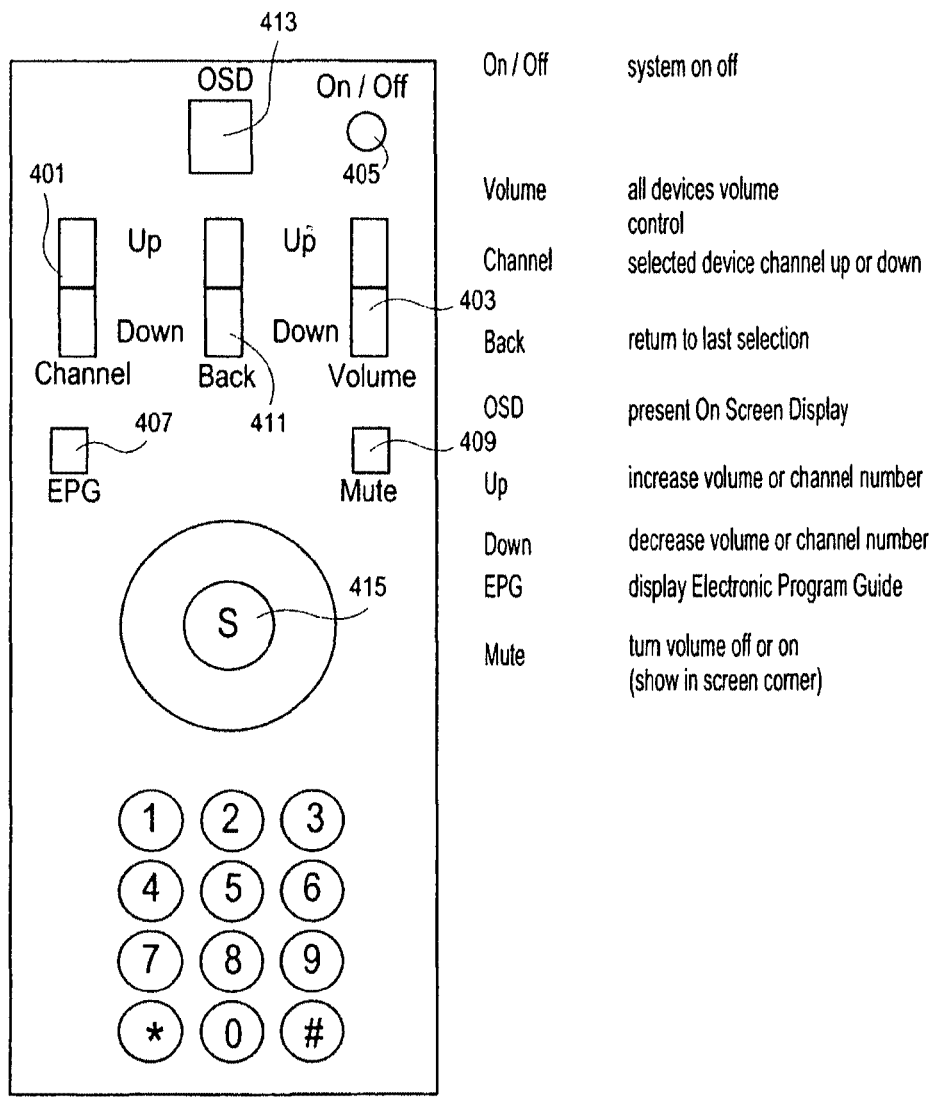
FIG. 4 is a diagram of one embodiment of a remote control for use with the on screen display system.

FIG. 4 is a diagram of one embodiment of a remote control for use with the on screen display system. The remote control can offer an array of buttons and similar input mechanisms to interact with the on screen display interface as well as other aspects of the television system. The buttons and input mechanisms can include buttons or switches for channel selection 401 (e.g., up or down or specific channel number inputs), volume 403, power 405, electronic program guide 407, mute 409, back 411, on screen display 413, navigation pad 415 and similar input mechanisms.

The remote control may provide a navigation pad 415 in the form of any type of buttons, directional pad or similar input mechanism to allow the user to select, highlight, or similarly indicate an input source or similar navigation options and confirm its selection. The navigation pad 415 will typically be used to move a cursor, tab, pointer, highlight or similar selection mechanism.

Input mechanisms for other features such as the on screen display, power, electronic program guide and mute act as toggles for the relevant features. The on screen display (OSD) button 413 causes the on screen display menu to be displayed when an input source is being viewed or returns to the input source when the on screen display menu is being viewed. The electronic program guide (EPG) button 407 causes the electronic program guide, which is a listing of program times and channels, to be displayed when an input source is being viewed or returns to the input source when the electronic program guide is being viewed. A mute button 409 toggles the volume on and off for the television. A back button 411 toggles between the last channel selection or navigation selection and the current selection.

Any feature of the television system can be assigned to a button or similar input mechanism of the remote control. The remote control can be designed to limit the number of total buttons so as to minimize the confusion caused to some users by a large number of specialized buttons. Instead, the focus of the remote control is to provide basic functionality (e.g., channel and volume adjustment) and to activate the on screen display menu for all other functionality.

Other devices may be utilized in place of or in conjunction with the remote control. Other devices may include keyboards, mice, motion sensitive devices (e.g., the WIIMOTE® by Nintendo) and similar peripheral input devices. The television system can be configured to interact with any type of input device.

Figure 5:
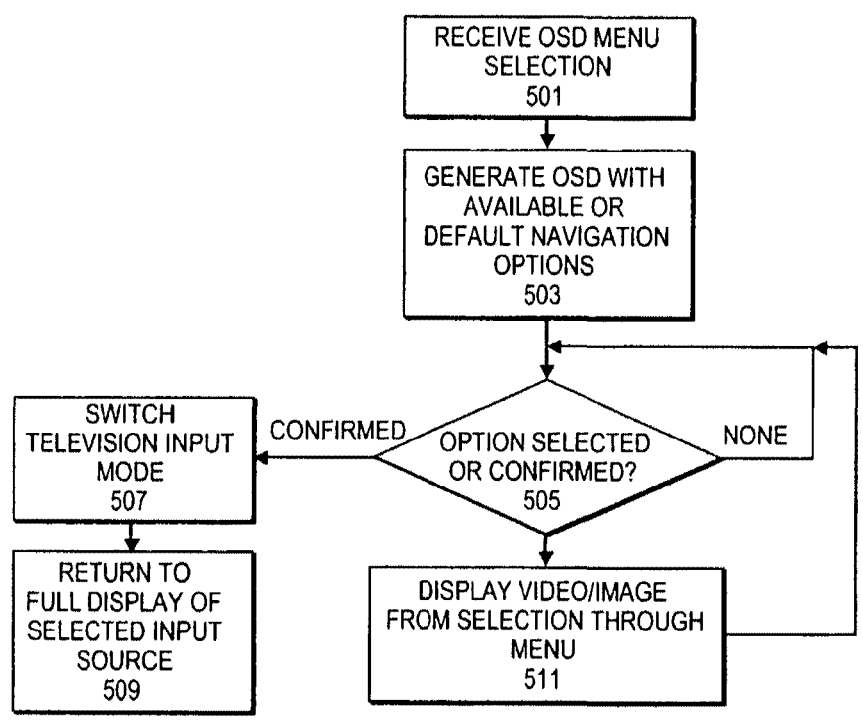
FIG. 5 is a flowchart of one embodiment of a process for presenting an on screen display system.

FIG. 5 is a flowchart of one embodiment of a process for presenting an on screen display input system. The on screen display menu is presented in response to an input from a user (block 501). The input can be from an on screen display button or similar input mechanism of a remote control for the television system, from a button or similar input mechanism attached to the television system or monitor or from another attached device such as the personal computer or a peripheral attached to such a device. The television system responds by generating the on screen display menu (block 503). The television system can have a set of default menu options, user defined or selected menu options, or automatically detected menu options or combinations thereof. The presentation of the menu options can be in any layout including a grid layout, circular layout, three dimensional layout or similar layout.

The on screen menu reacts to further input of the user received from any input mechanism or source (block 505). The user can interact with the on screen display menus through a navigational pad or similar input mechanism to select a navigation option or confirm the navigation option that is selected. A default navigation option may be initially selected. The on screen display will continue to be displayed in response to inaction by the user. In another embodiment, the on screen display may time out causing the on screen display menu to be closed and the currently selected input source to be displayed or for no change in input source to be made.

If a user input is received to change the selection, then the on screen display menu alters the indication of selection (e.g., highlights the newly selected navigation options) and can alter the display of an associated input source to enlarge it, update it, start playback or similarly emphasize the input source or provide additional information about the input source (block 511). Once selected, the on screen display menu waits for further input from the user (block 505).

If a user input is received that confirms a selection, then the on screen display system initiates an action to switch to the confirmed television input source (block 507). The on screen display menu can also display navigation options that alter settings, display modes or similar navigation options. Confirmation of one of these navigation options can alter the mode, update a setting or similarly alter the state of the television monitor or television system.

The confirmation of a selection can cause the on screen display menu to close (block 509). This allows the television system to switch to the selected input source and output it in a full screen mode (or at any selected settings) to the television monitor. Other types of confirmed navigation options can cause the changing of state information and the update of the on screen display menu.

Figure 6A:
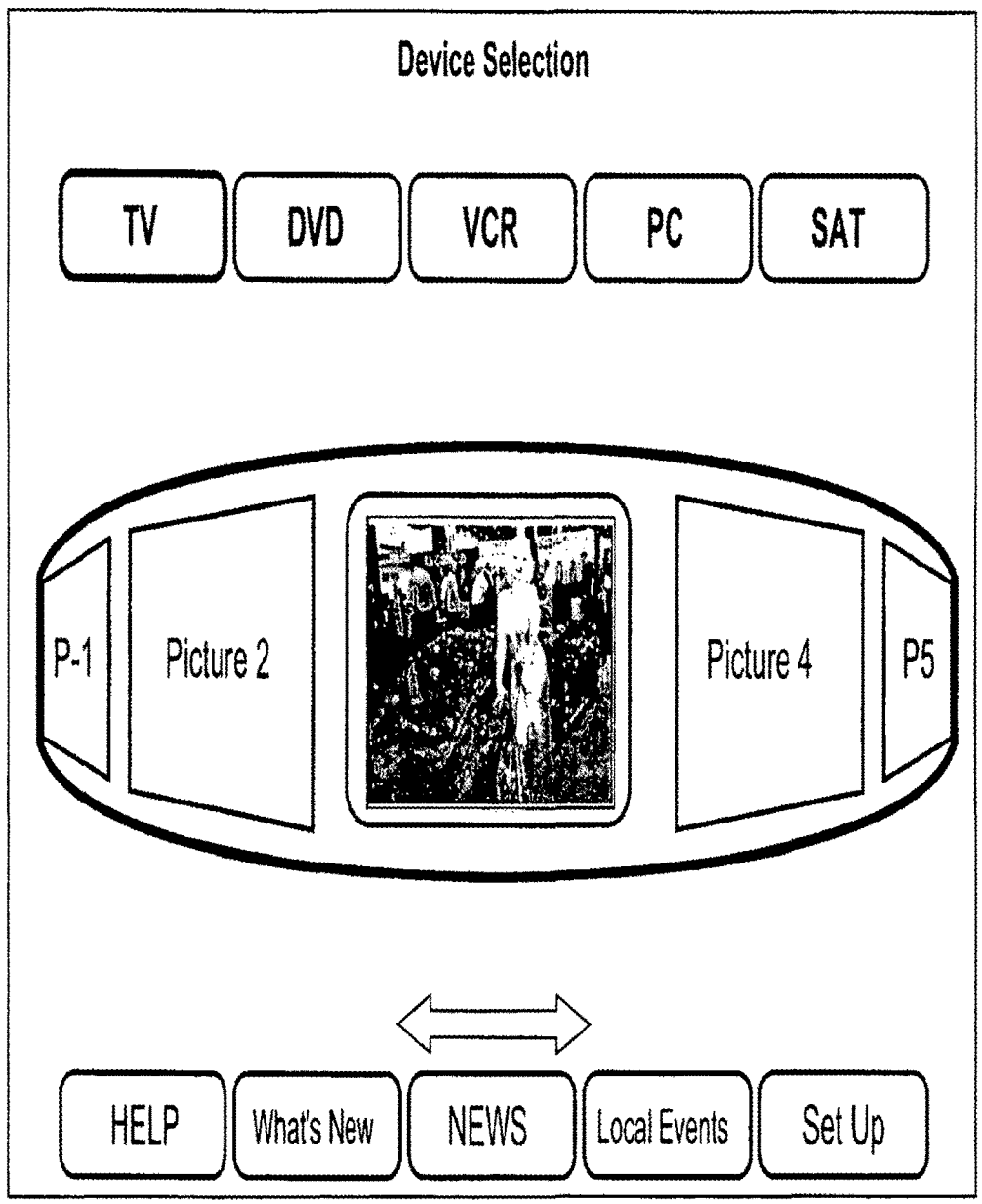
FIG. 6A is a diagram of one embodiment of an on screen menu for input selection.

FIG. 6A is a diagram of one embodiment of an on screen menu for input selection. In the diagram, an embodiment with navigation options arrayed across the top and bottom of the menu is illustrated. The input source videos or images are arrayed across the middle of the on screen display. The example diagram shows the image from the currently selected (TV) input source. However, other input source images or video could also be displayed in the Picture 1-Picture 5 slots.

The example interface provides a set of input sources as: TV, DVD, VCR, PC, SAT (satellite), Help, What's New, News, Local Events and Setup. These options and this layout are provided by way of example. One skilled in the art would understand that the layout and available options can be varied, reduced, increased, layered or otherwise reorganized consistent with the principles of operation described herein.

The TV, DVD, VCR, PC and SAT navigation options allow a user to select an input source by selecting the corresponding icon on the screen. As each icon is selected, the corresponding input source video and audio are displayed and output to allow a user to confirm that the desired content has been selected. Navigation of the menu can be effected through the remote control, which includes a navigation pad or similar input mechanism that allows a user to input directional input to move between navigation options.

The Help, What's New, News, Local Events and Set Up options can be selected to view additional information through the on screen display system. The Help option can provide additional information about using the on screen display system and the television system. The What's New option can provide information about the latest services offered through the on screen display system for the television system. The News option provides additional information about current events from any news source. The Local Events option can similarly provide information that is related to local events near the user. The Set Up option allows a user to access a menu or set of menus that control the settings for the television system such as brightness, contrast, sound, picture, hue, connections and similar aspects of the television system. Some of these options may draw from data provided by other attached devices, a local personal computer or remote server.

Figure 6B:
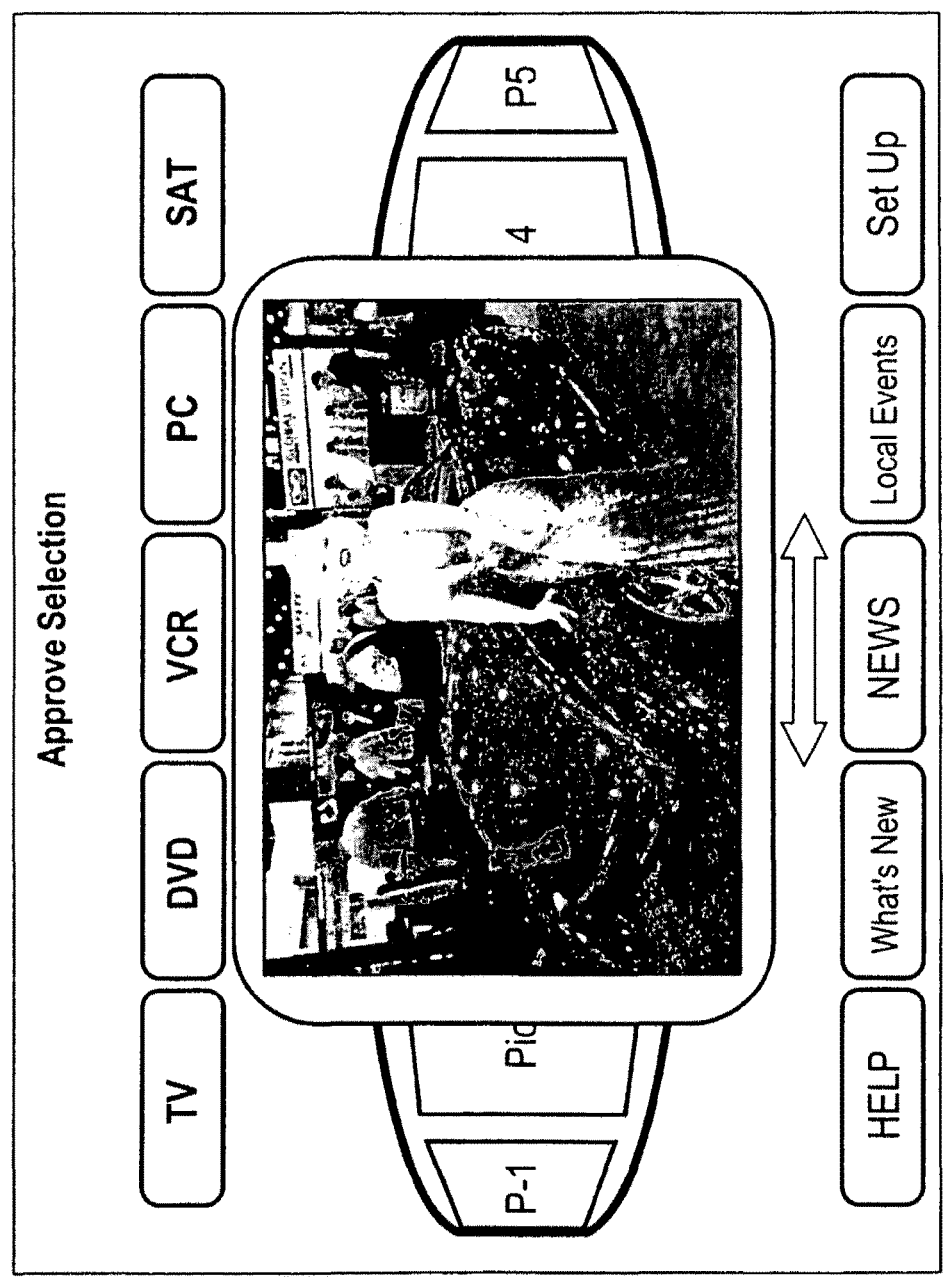
FIG. 6B is a diagram of one embodiment of an on screen menu for input selection where an input source has been initially selected.

FIG. 6B is a diagram of one embodiment of an on screen menu for input selection where an input source has been initially selected. This example illustrates an embodiment where selection of an input source, here the TV input source, is responded to by enlarging the image or video from that input source. This allows a user to more closely inspect the input source to verify that it is the one that is desired to be selected. This can coincide or be replaced by the output of related audio, the activation of video playback, updating of the image shown or display of similar information.

Figure 6C:
FIG. 6C is a diagram of one embodiment of an on screen menu for input selection where an input source selection has been confirmed.

FIG. 6C is a diagram of one embodiment of an on screen menu for input selection where an input source selection has been confirmed. This screen illustrates the results of confirming the selection from FIG. 8B. The input source is then output to the entire screen. A message such as 'watch the show' can also be displayed to allow the user to see that the transition has been made or to allow another level of confirmation, where the user selects the display text or icon to additionally confirm that the correct input source has been selected.

Figure 6D:
FIG. 6D is a diagram of one embodiment of an on screen menu for input selection where an option to change input source selection has been presented.

FIG. 6D is a diagram of one embodiment of an on screen menu for input selection where an option to change input source selection has been presented. The illustrated screen shows a prompt to a user to determine whether the user desires to change the input source. This prompt can be displayed in response to a user interaction with a remote control, such as the activation of an 'OSD' button to confirm that the user does want to switch to the on screen display menu. A further press of the OSD button or similar input can be used to confirm the selection or another button or a timeout can counter the selection.

Figure 6E:
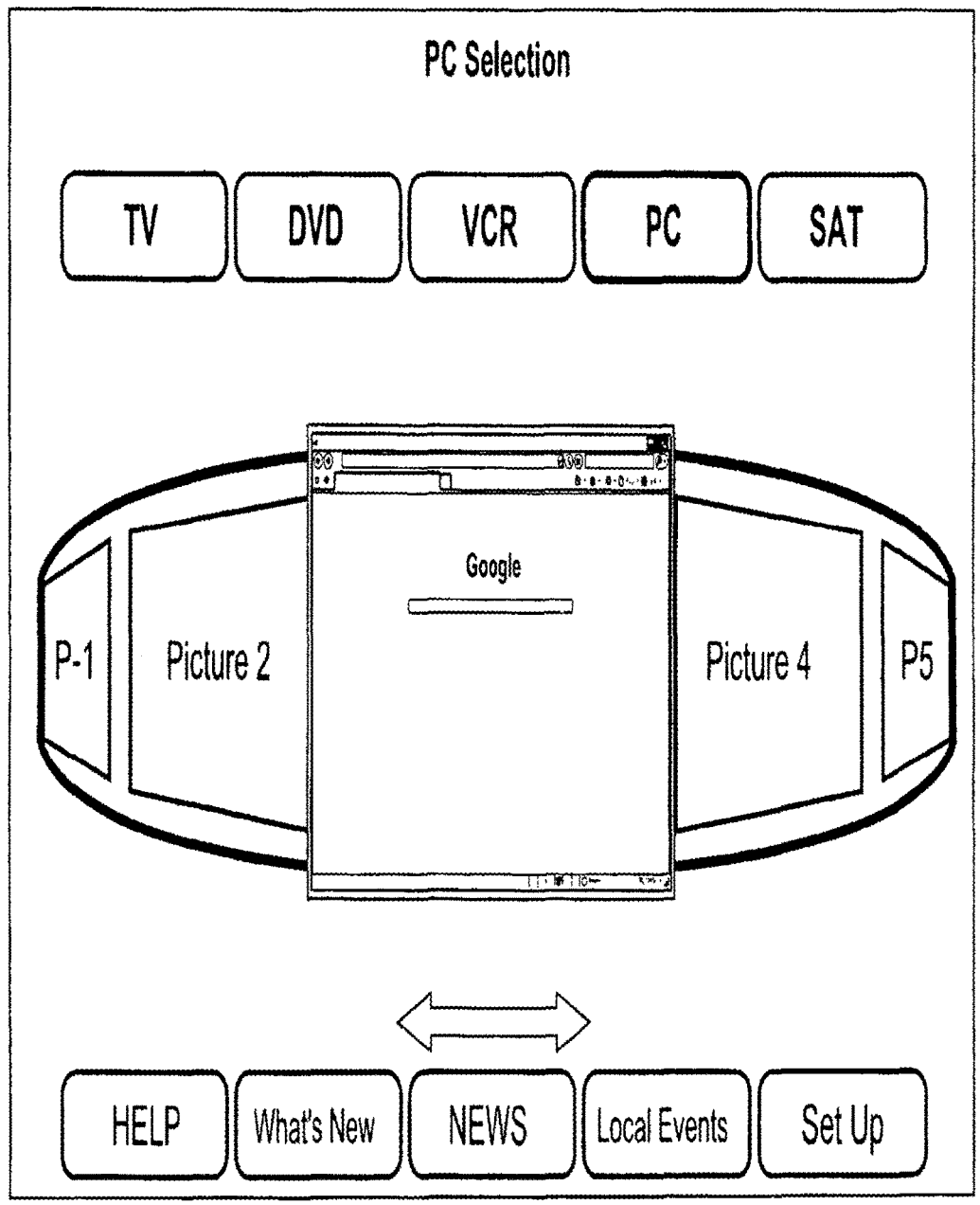
FIG. 6E is a diagram of one embodiment of an on screen menu for input selection where a personal computer input source selection has been selected.

FIG. 6E is a diagram of one embodiment of an on screen menu for input selection where a personal computer input source selection has been selected. This diagram illustrates the selection of a personal computer input source. Similar input sources can be handled analogously such as console devices. The menu informs a user that to utilize the input source another peripheral device such as a keyboard, mouse, the WIIMOTE® by Nintendo or similar peripheral device should be utilized to interact with the new input source. This information helps the user to transition between interacting with the television system with the remote control and interacting with other attached devices such as the personal computer or console device.

Figure 6F:
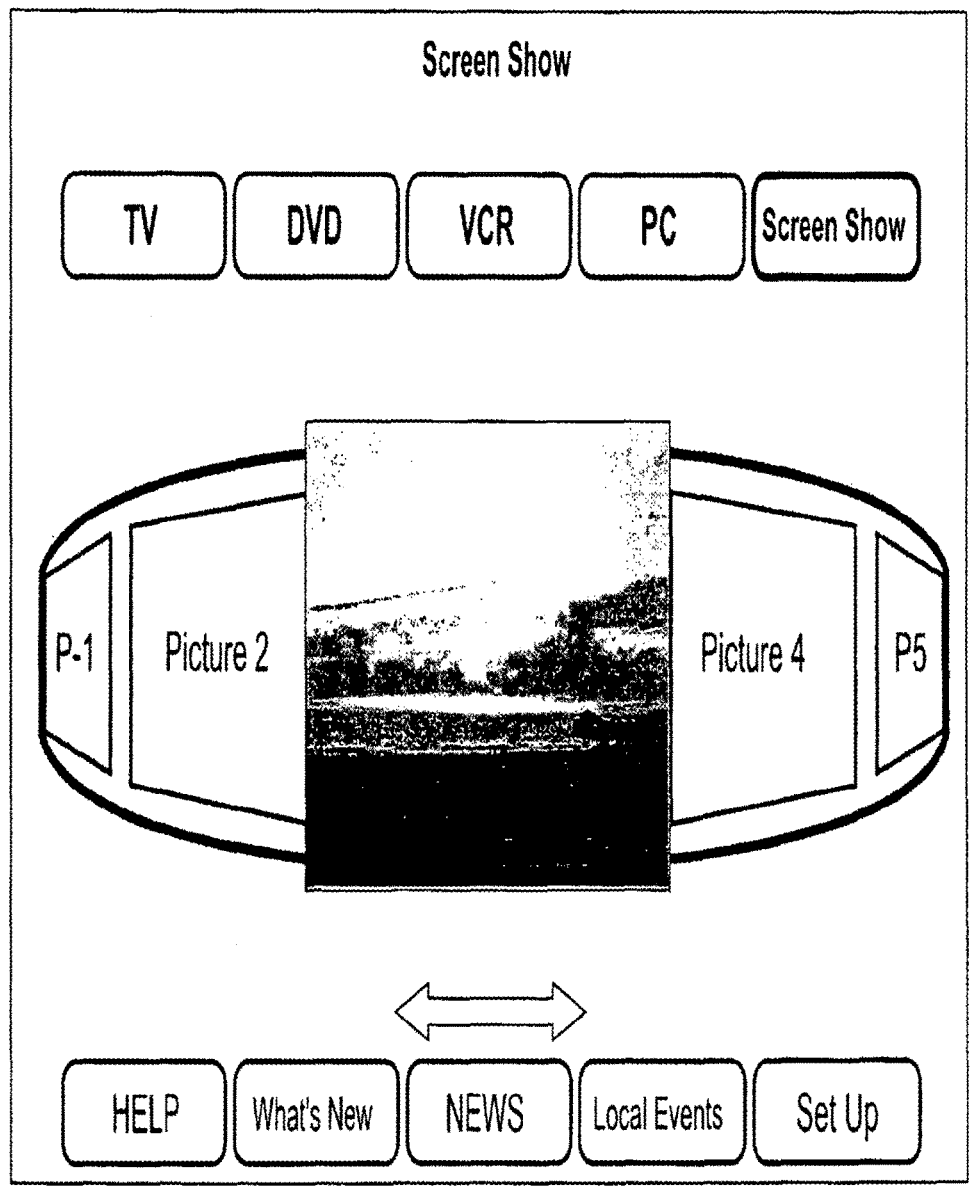
FIG. 6F is a diagram of one embodiment of an on screen menu for input selection where a slideshow option has been selected.

FIG. 6F is a diagram of one embodiment of an on screen menu for input selection where a slideshow option has been selected. This embodiment illustrates the display of a screen show (e.g., a slideshow) by the television system. The television system can have a memory reader or storage device that allows images to be stored and accessed for display through the television monitor. The screen show may stylize or augment the playback of images with music, graphics or similar effects. The screen show can be automated or advanced through the remote control or similar device.

Figure 7A:
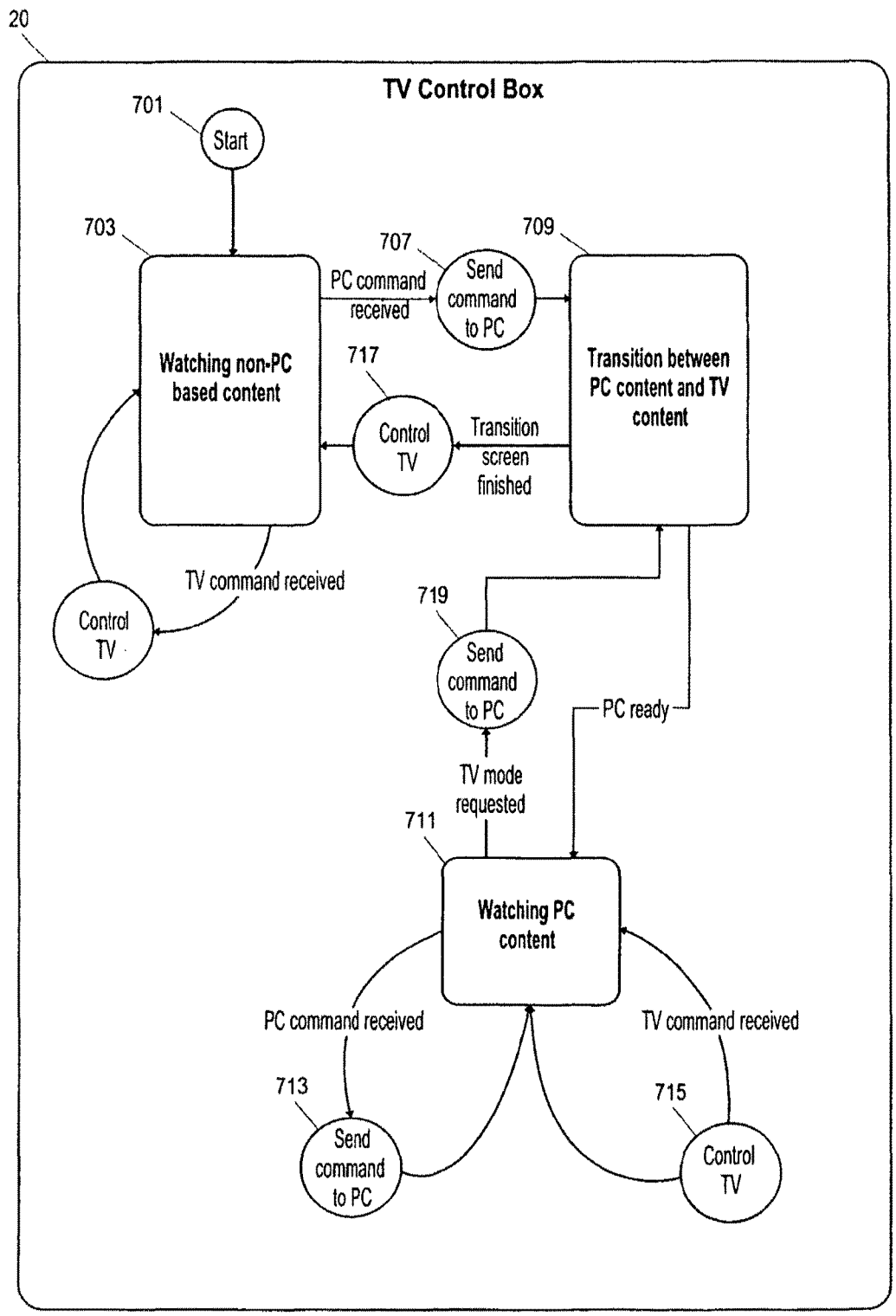
FIG. 7A is a flowchart of one embodiment of a process for managing interaction with a personal computer through the television system.

FIG. 7A is a flowchart of one embodiment of a process for managing interaction with a personal computer through the television. This process can be performed by the television system. The television system communicates and interacts with the personal computer or similar device to provide a more integrated experience between the television system and the personal computer.

The process can be initiated (block 701) in a default mode where the television system is displaying a non-personal computer input source through the television system (block 703). As long as all input from the user through the remote control or similar devices is sending a television related command (e.g., volume or channel adjustment) then the television system stays in the non-personal computer based content display mode (block 705).

However, if a command is received from a remote control that is related to control or interaction with a personal computer, then a command is sent to the attached personal computer (block 707). The personal computer may be connected to the television system through any type of communication medium such as USB, Firewire, RS-232 or similar communication mediums.

In response to receiving a personal computer related command the television system may begin to transition the displayed input source from the currently selected input source (block 709) to the personal computer input source (block 711). The transition may involve the on screen display menu or may be a transition screen, fade or similar transition technique. In some cases the personal computer may need to be booted (e.g., the television system can provide the software or applications to be executed) or an application on the personal computer may need to be started to handle the incoming command from the television system. In these cases, the transition screen can inform the user of the status of the personal computer and let them know it is loading.

Once in the personal computer content display mode both television commands and personal computer commands can be received from peripheral devices and other input sources (blocks 713 and 715). If a television mode or input source switch is requested then the transition back to a non-personal computer display mode is initiated. This also includes sending a command to the personal computer to instruct it to transition to a standby mode, shut down or similar react to the command (block 719). The transition screen can again be the on screen display menu, a status screen, fade or similar transition screen. Television controls are then processed again (block 717) until the personal computer mode is needed.

Figure 7B:
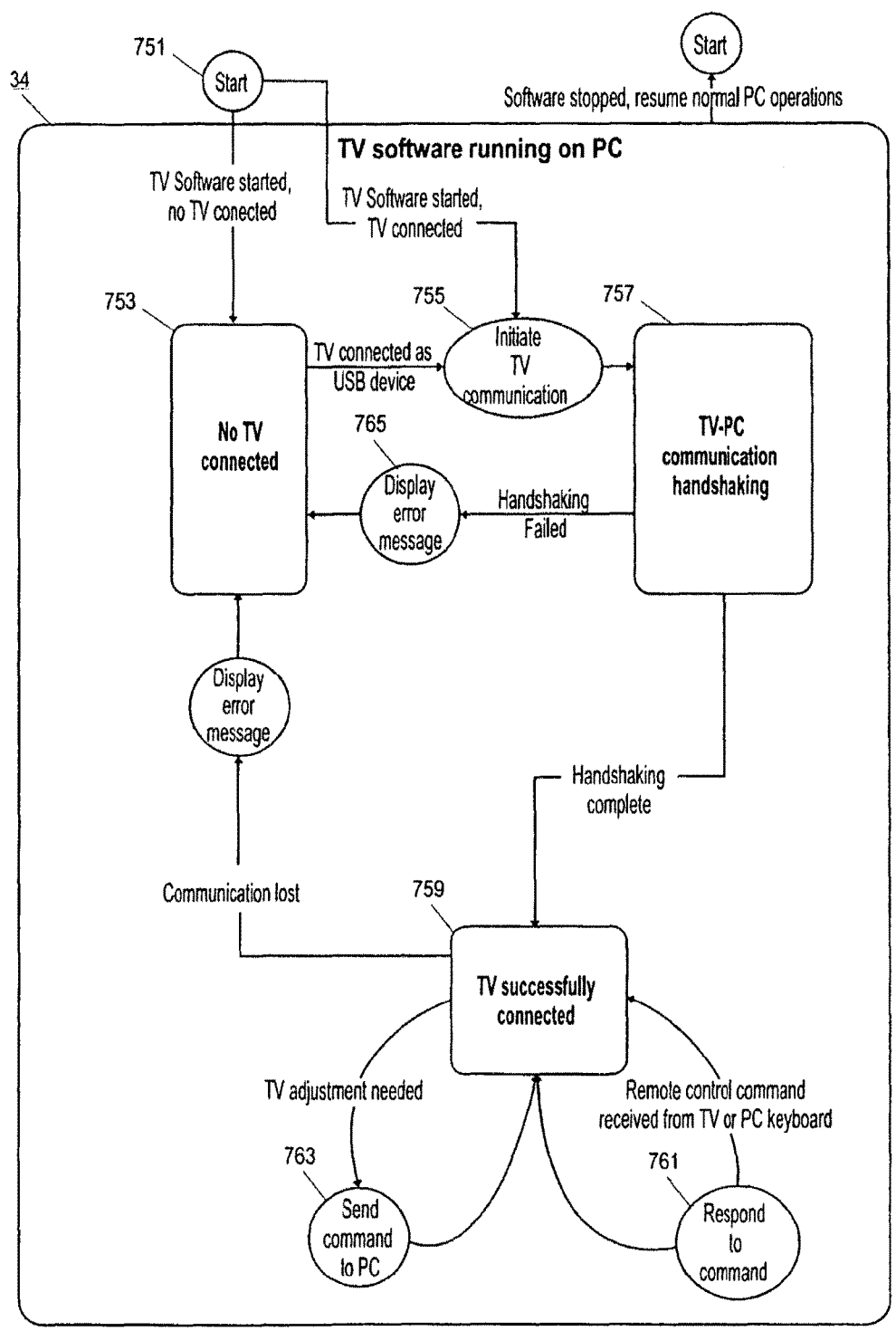
FIG. 7B is a flowchart of one embodiment of a process for managing interaction with a personal computer through the television system.

FIG. 7B is a flowchart of one embodiment of a process for managing interaction with a personal computer through the television. In this embodiment, the personal computer executes software that is able to control the functionality of the television system including the television monitor. The example of a personal computer is given. However, one skilled in the art would understand that other types of computing devices including console devices, handheld devices and similar computing devices could also execute this or similar software.

This software can be started at any point by a user (block 751). The software checks if a compatible television is known to be connected with the computer. If a compatible television system is not connected (block 753), then the software enters a state of operation that recognizes the lack of a connection. An attempt to initiate communication with the television system can be started (block 755). The communication can be initiated over a USB connection or similar type of connection.

If the software is aware that a television system is connected, then it commences with the initiation of communication with that television system. The initiation of communication involves a handshaking protocol between the television system and the personal computer (block 757). The handshaking protocol can utilize any format or procedure. The handshaking allows the television system and personal computer to confirm each devices presence and ability to communicate over a communication medium. If the handshaking fails (due to a time out or similar mechanism), then an error message can be displayed by both the television system and the personal computer (block 765).

If the handshaking process is successful, then the software enters a television operation mode (block 759). The personal computer can receive signals from the user through the remote control directly or through the television system. The personal computer can then determine how to respond to the received commands (block 761). The personal computer can issue commands to the television system (block 763), if an adjustment is required (e.g., to handle a command from the remote).

If at any point during operation in the connected state, communication between the television system and the personal computer is lost, then the software can generate an error message display or similar feedback and return to the non-connected stage (block 753).

The following examples of television system and personal computer interaction are given by way of example and not exhaustive for sake of clarity in describing the television system.

In an example where a personal computer is connected to a television system, the user installs special software onto their personal computer, or purchases a personal computer with the software installed. The personal computer is connected to the television system by using a USB cable or similar connector. Upon connecting the personal computer to the television system, the personal computer will recognize that a USB device has been connected. The personal computer will initiate communication with the television system to determine the capabilities of the television system and to inform the television system that a personal computer has been successfully connected. Optionally, the television system and personal computer will perform a handshaking routine.

Also, optionally, the personal computer will learn the television firmware version. The personal computer informs the television system what new menu items need to be added, and what the new menu structure should be. At this point, the personal computer and television have been successfully connected. The user will be notified on the personal computer that the television system is connected and ready to use In an example embodiment where a personal computer mode is entered, the user may be watching content from a non-personal computer source, such as cable or a DVD player. The user presses the OSD button on the remote. The television system draws the on-screen display menu. The user selects personal computer based content. The television sends a request for the selected content from the personal computer and switches to the personal computer input. If the personal computer is not connected, the television system will display a "PC not connected" message, and will not change inputs. The television system then removes the on-screen display menu.

In an example where personal computer control is initiated, the television is set to the personal computer input and the user watches personal computer-based content. The user presses a personal computer related button, such as channel up. The television system sends the command to the personal computer. The personal computer responds to the remote control command. The user presses a non-personal computer-related button, such as volume up. The television responds to the remote control command.

The personal computer needs to automatically adjust the television system. The personal computer sends a command to the television system, such as brightness down. The television system responds to the personal computer command.

In an example of exiting a personal computer mode, the television is set to the personal computer input and the user watches personal computer-based content. The user presses the "OSD" button on the remote control. The television draws the on screen display menu. The personal computer draws any additional personal computer specific on screen display menu. The user selects a non-personal computer menu source, such as a DVD player. The television system sends the command to the personal computer. The television system switches to the DVD player input source. The personal computer stops drawing the on screen display menu and optionally stops playing the current content. At this point, the television system has exited personal computer mode, and will not pass any remote control commands to the personal computer. Optionally, the television system will ignore personal computer commands until it has re-entered personal computer mode.

In an example of a television system mode, the television is set to any non-persona computer input, such as cable. The user presses any remote control button, such as channel up. The television system will respond to the button press. For example, if watching television, the television system will increase the current channel. If watching a DVD input source, the television system will not respond to the button press.

Figure 8:
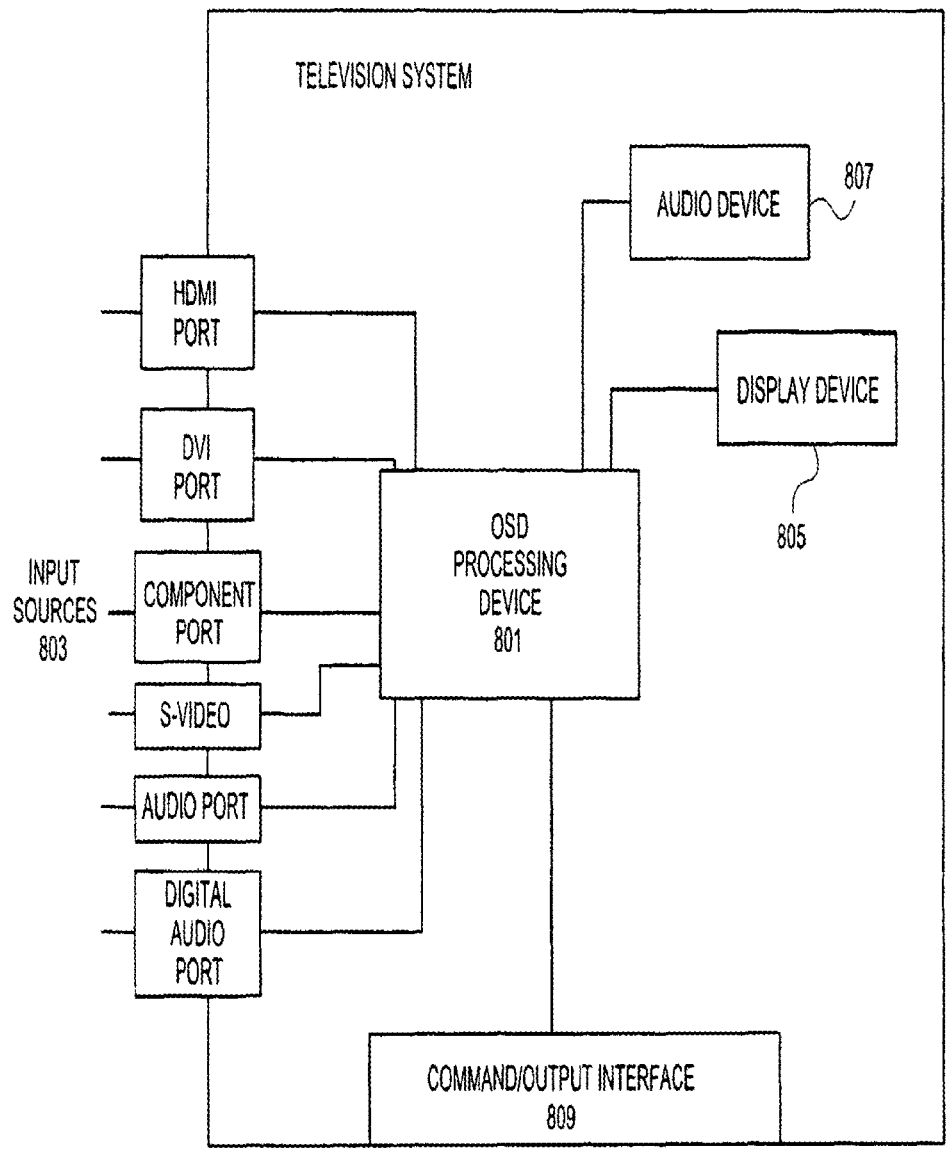
FIG. 8 is a diagram of one embodiment of the components of the television system.

FIG. 8 is a diagram of one embodiment of the components of the television system. In one embodiment, the television system includes a processing device 801, display device 805, audio device 807, a set of video and audio input ports 803 and a command or output interface 809. These components can disposed within the housing of a television, on a removable card, in an external box or other component.

The input ports 803 can include any number or type of audio or video input ports. The input ports can include HDMI inputs, DVI inputs, Component inputs, S-video inputs, audio inputs including analog and digital (e.g., fiber optic) and similar input ports. These input ports 803 can be in direct or indirect communication with the processing device 801. For example, intermediate source selection or mixing components can be controlled by the processing device 801.

The processing device 801 generates and integrates the on screen display with the incoming signals to generate a set of output signals for the display device 805 and audio device 807. The processing device 801 controls the selection of input source and generates commands to the command or output interface 809 to control or interact with external device or pass input signals to those external device as described herein above. The processing device 801 can be a general purpose processor executing embedded software or locally stored software (e.g., in a read only memory (ROM), magnetic storage device, Flash device or similar storage device). In another embodiment, the processing device 801 is an application specific integrated circuit (ASIC) or similar processing device to implement the on screen display and related software as hardware or to execute it as firmware. The processing device 801 can be monolithic processing device or set of processing devices that execute different functions as described herein.

The command or output interface 809 transmits signals to external devices including audio, video, data and command signals. The command or output interface 809 can be implemented as a set of general purpose processing devices or ASICs. The processing device 801 provides the input signals and commands to be transmitted to the external devices over any type of communication medium and over any type of audio/video port.

The display device 805 can be any type of display including CRT, LCD, projector, OLED, LED or similar display device. The audio device 807 can be any type or number of speakers or similar audio output devices.

Thus, a method and apparatus for providing an on screen display for managing input sources for a television system has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

What is claimed is:

1. A method comprising:
    determining, via a processor of a computing device, if a television system is communicatively coupled to the processor;
    upon determining the television system and the processor are communicatively coupled, sending, from the processor to the television system, a message in accordance with a handshaking protocol to initiate a connection with the television system;
    entering, via the processor, a television operation mode;
    upon entering the television operation mode, receiving, via the processor, television firmware version data from the television system; and
    providing, from the processor to the television system, an indication of menu items to be added to an on screen menu of the television system based on the television firmware version data.

2. The method of claim 1, wherein the processor and the television system share a common circuit board.

3. The method of claim 1, further comprising:
    upon determining the television system and the processor are not communicatively coupled, entering a state of operation that recognizes a lack of connection.

4. The method of claim 1, wherein receiving the television firmware version data is performed automatically during connection of the television system with the processor.

5. The method of claim 1, further comprising providing an indication of a new menu structure of the on screen menu to the television system based on the television firmware version data.

6. The method of claim 1, farther comprising providing a request for capability information to the television system, wherein the television firmware version data is received responsive to providing the request.

7. A system comprising:
    a processor of a computing device, wherein the processor is configured to be coupled to a television system, and wherein the processor is configured to:
        determine if the television system is communicatively coupled to the processor;
        send a message in accordance with a handshaking protocol to the television system to initiate a connection with the television system upon determining the television system and the processor are communicatively coupled;
        enter a television operation mode;

receive television firmware version data from the television system; and provide, to the television system, an indication of menu items to be added to an on screen menu of the television system based on the television firmware version data.

8. The system of claim 7, wherein the processor is housed within a housing of the television system.

9. The system of claim 7, wherein the processor and the television system share a common circuit board.

10. The system of claim 7, wherein the processor is further configured to enter a state of operation that recognizes a lack of connection upon determining the television system and the processor are not currently communicatively coupled.

11. The system of claim 7, wherein the processor is further configured to receive the television firmware version data automatically during connection of the television system with the processor.

12. A device comprising:
a display configured to display visual content;
a processor operatively coupled to the display, wherein the processor is configured to:
determine if the processor is communicatively coupled to a computing device;
receive a message from the computing device to request a connection with the computing device upon determining the processor and the computing device are communicatively coupled, the message communicated in accordance with a handshaking protocol;
provide television firmware version data to the computing device; and
receive, from the computing device, an indication of menu items to be added to an on screen menu of the display based on the television firmware version data.

13. The device of claim 12, wherein the processor is further configured to identify each of a plurality of input signals from a plurality of input sources, each of the plurality of input sources coupled to the processor, wherein each of the plurality of input signals is unique to each of the plurality of input sources, and wherein the processor is configured to identify each of the input signals by analyzing each of the input signals.

14. The device of claim 13, wherein a first input source of the plurality of input sources is a computing device and a second input source of the plurality of input sources is a television device.

15. The device of claim 13, wherein a first input source of the plurality of input sources and a second input source of the plurality of input sources are physically coupled together.

16. The device of claim 13, wherein a first input source of the plurality of input sources and a second input source of the plurality of input sources are configured to be in wireless communication with the display.

17. The device of claim 12, further comprising a network interface configured for communication with external networked devices.

18. The device of claim 17, wherein the network interface is configured to communicate with an input source via the Internet.

19. The device of claim 12, wherein the processor is further configured to receive an indication of a new menu structure of the on screen menu from the computing device based on the television firmware version data.

20. A method comprising:
determining if a processor of a television system is communicatively coupled to a computing device, wherein the processor is coupled to a display of the television system;
receiving a message from the computing device at the processor, the message requesting a connection between the processor and the computing device, the message communicated in accordance with a handshaking protocol;
providing television firmware version data to the computing device; and
receiving, from the computing device, an indication of menu items to be added to an on screen menu of the display based on the television firmware version data.

* * * * *